United States Patent [19]

Bestler et al.

[11] Patent Number: 4,995,080
[45] Date of Patent: Feb. 19, 1991

[54] TELEVISION SIGNAL SCRAMBLING SYSTEM AND METHOD

[75] Inventors: Caitlin B. Bestler, Chicago; Richard W. Citta, Oak Park; Michael E. Long, Oak Brook, all of Ill.

[73] Assignee: Zenith Electronics Corporation, Glenview, Ill.

[21] Appl. No.: 552,375

[22] Filed: Jul. 16, 1990

Related U.S. Application Data

[63] Continuation of Ser. No. 228,905, Aug. 4, 1988, abandoned.

[51] Int. Cl.$^5$ .......................... H04L 9/08; H04N 7/167
[52] U.S. Cl. ........................................ 380/21; 380/10; 380/20
[58] Field of Search ................................ 380/5, 10–17, 380/19, 20, 21, 49; 358/349, 145, 147

[56] References Cited

U.S. PATENT DOCUMENTS

| | | | |
|---|---|---|---|
| 4,694,491 | 9/1987 | Horne et al. | 380/20 |
| 4,736,422 | 4/1988 | Mason | 380/20 |
| 4,771,458 | 9/1988 | Citta et al. | 380/20 |
| 4,802,215 | 1/1989 | Mason | 380/20 X |
| 4,803,725 | 2/1989 | Horne et al. | 380/20 X |
| 4,817,144 | 3/1989 | Citta et al. | 380/20 |
| 4,866,770 | 9/1989 | Seth-Smith et al. | 380/20 |

Primary Examiner—Stephen C. Buczinski
Assistant Examiner—Bernarr Earl Gregory

[57] ABSTRACT

A method of operating a pay per view (PPV) television system includes transmitting global data packets alternately encrypted with two different session keys. Subscriber terminals store three session keys, and automatically sequence through the session keys in an ateempt to decrypt the data packets. A program tag in the global data packet identifies a television program and a memory location in the subscriber authorization memory and may also include a tag identifying an upcoming program for which the subscriber may self-authorize his terminal by accessing the memory location identified by the PPV tag. The program tag is required to enable the subscriber terminal descrambling means to descramble the accompanying television program. Subscriber terminals are periodically polled by addressed data packets whereupon the contents of their authorization memories are sent to the cable heat-end for billing purposes. After successful polling, a new session key is downloaded to the subscriber in an addressed data packet. After polling of all subscribers, the memory location identified by the PPV tag is cleared by means of a global data packet encrypted in the new session key which only polled subscriber terminals have. An unpolled subscriber terminal needs to be polled before it receives the new session key.

6 Claims, 2 Drawing Sheets

TELEVISION SIGNAL SCRAMBLING SYSTEM AND METHOD

CROSS REFERENCE TO RELATED APPLICATION

This application is a continuation of application Ser. No. 07/228,905, filed August 4, 1988, now abandoned.

This application is related to application Ser. No. 126,452, filed 11/30/87 abandoned in favor of continuation application Ser. No. 442,474, filed 11/22/89, now U.S. Pat. No. 4,947,429, entitled PAY PER VIEW TELEVISION SIGNALLING METHOD in the name of R. Citta, application Ser. No. 025,236, filed 3/12/87, now U.S. Pat. No. 4,771,458, issued 9/13/88 entitled SECURE DATA PACKET TRANSMISSION SYSTEM AND METHOD in the names of R. Citta et al, and application Ser. No. 025,235, filed 3/12/87, now U.S. Pat. No. 4,817,144 issued 3/28/89 entitled SECURE TV SCRAMBLING SYSTEM USING FRAMING CODE SWITCHING in the names of R. Citta et al, all of which are assigned to Zenith Electronics Corporation, and all of which are hereby incorporated by reference.

BACKGROUND OF THE INVENTION AND PRIOR ART

This invention relates generally to a novel method of operating a pay television system and particularly to an improved method of operating a pay television system that permits a subscriber to self-authorize his terminal to unscramble special pay per view television programs.

While the inventive method will be described in a cable television environment, it will be appreciated that it is also applicable to over-the-air television signalling systems. In its broadest aspects, the present invention is directed to a novel subscription television system of advanced security and simplicity. In its more specific implementation, the present invention is directed to a simple, secure, in-band pay per view television programming arrangement of enhanced flexibility.

In pay television systems, each subscriber terminal is typically identified by a unique address which permits the cable head-end to selectively communicate with the terminals. Each terminal also includes a microprocessor based controller and an authorization memory that has a plurality of memory locations containing authorization data that define various levels of service for which the subscriber is authorized and has paid. An unscrambler (decoder) in each subscriber terminal decoder is controlled by its authorization memory for selectively enabling unscrambling and viewing of scrambled television signals transmitted from the cable head-end. Typically, the television signal is transmitted with a program tag that is included in a data packet that identifies a particular single bit memory location in the subscriber terminal authorization memory. The corresponding memory location stores either a logic 1 or a logic 0 that determines whether the subscriber terminal is authorized or not authorized, respectively, to receive the accompanying program.

Communication between the subscriber terminal and the cable head-end is either in-band or out-of-band. In an in-band system, the communication occurs over a received television channel, whereas in an out-of-band system, the communication link is separate from the television channels. Since not all television channels in an in-band system include data, steps are normally taken to insure that the subscriber terminals tune to a data-carrying channel when the terminals are turned off. This channel is referred to as a homing channel and allows communications with the terminals even though they are ostensibly turned off. Such communications may include polling commands from the head-end for billing purposes and other control functions.

In the copending application, in addition to the program tag, an impulse pay per view (IPPV) tag that identifies a memory location in the subscriber terminal authorization memory may also be included in the transmitted data. The program tag and the IPPV tag may identify the same or different memory locations. A received, non zero, IPPV tag results in a suitable indication at the subscriber terminal decoder that the program associated with the IPPV tag may be "bought" by the subscriber taking appropriate action. The subscriber may purchase the program so identified by using a personal password to access the authorization memory and set the memory location defined by the IPPV tag to 1. Periodically, the head-end "polls" each subscriber terminal via an addressed data packet for reading the contents of the respective authorization memories. The subscriber terminals individually respond by transmitting authorization memory information to enable the head-end to determine the status of the memory location or locations defined by the IPPV tag or tags. Based upon this memory information, the head-end can determine whether the subscriber bought one or more IPPV programs and thereby the amount that is to be billed for such special event programming.

The head-end also clears the authorization memory, or a selected portion thereof, when a subscriber terminal has been successfully polled, that is when the contents of its authorization memory have been transmitted back to the head-end. In an in-band system, polling may not be accomplished if the subscriber terminal is not tuned to a data channel. In systems that do not have a homing channel, polling of the subscriber terminal may not be accomplished for some time. During this time period, reuse of that memory location for another program would permit unpolled subscriber terminals, i.e. those that have not had that location in their authorization memory interrogated and reset by the head-end, to receive further pay per view programs without being billed therefor.

In U.S. Pat. No. 4,771,458, a series of data packets are encrypted with the first "global" data packet (which includes the program and IPPV tags) being encrypted with a session key that all authorized subscribers should have, followed by a subsequent group of addressed data packets which are specifically directed to individual subscriber terminals. Each subscriber terminal stores three different session keys, one of which may not be changed and which is known as a default key. The head-end may change the session key used to encrypt the global packets from time to time whereby each subscriber terminal will sequence through its stored session keys in an attempt to decrypt received global packets. The stored session keys may be periodically updated by the cable head-end by downloading new session keys to subscriber terminals in individually addressed encrypted data packets. Since program tags and IPPV tags are included in the global packets, a subscriber terminal needs the correct session key in order to identify the program tag, which will be recalled, is essential for proper operation of his unscrambler.

In the system of the invention, the global data packets are alternately encrypted with two different session keys which, as will be described, enables secure and reliable operation of an impulse pay per view system despite the inability to poll all subscribers for determining the status of their authorization memories. As will be readily apparent, the method of alternately encrypting global data packets with two different session keys may be used to operate a subscription television system wherein subscriber terminals do not have provision for storing more than one session key.

OBJECTS OF THE INVENTION

A principal object of the invention is to provide a novel subscription television system and method of operation.

Another object of the invention is to provide an improved pay per view television system and method.

A further object of the invention is to provide a simple, secure subscription television system.

A still further object of the invention is to provide a reliable, secure impulse pay per view television system that is not dependent upon a subscriber terminal being successfully polled.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
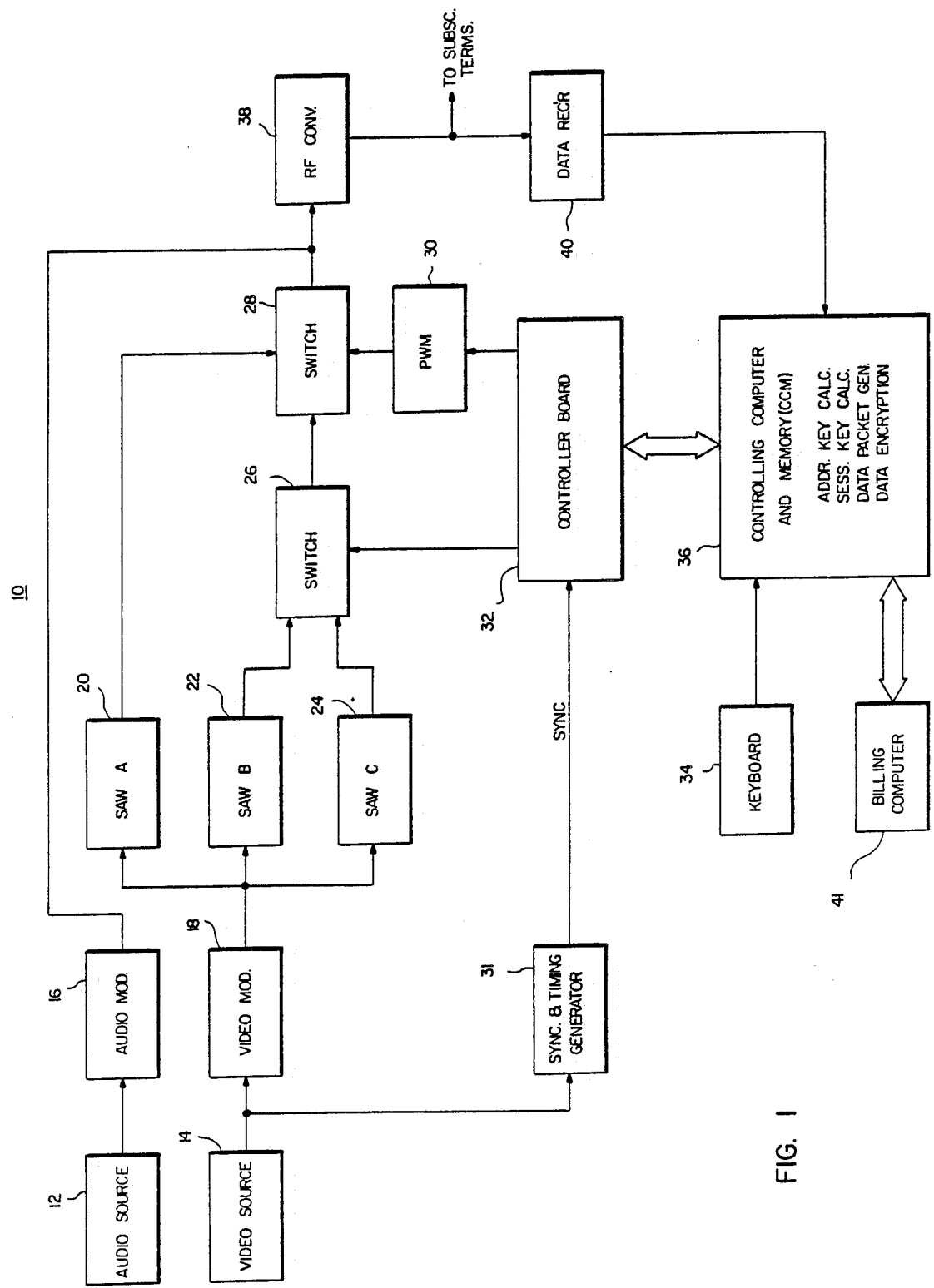
FIG. 1 is a simplified block diagram of a transmitter capable of performing the inventive method.

Referring to FIG. 1, a cable head-end is generally referred to by reference numeral 10. It includes an audio source of information 12, a video source of information 14, an audio modulator 16 and a video modulator 18. The output of video modulator 18 is coupled to three surface acoustic wave (SAW) filters identified as SAW A, SAW B and SAW C. SAW filters A, B and C impart predetermined phase and amplitude characteristics to the input modulated video information with SAW A generally imparting a 0° phase change and SAW B and SAW C imparting complementary phase changes. Synchronizing signal information is supplied from a sync and timing generator 31 based upon an input from video source 14 and supplied to a microprocessor based controller board 32 that controls a switch 26 coupled to the outputs of SAWs B and C. The output of switch 26 is supplied to another switch 28 to which the output of SAW A is supplied. Controller board 32 also controls a pulse width modulator 30 that in turn controls switch 28. Switches 26 and 28 operate under control of controller board 32 to alternately switch the output of video modulator 18 between SAWs A and B and between SAWs A and C and pulse width modulator 30 operates to vary the width of the horizontal blanking interval in the video signal to convey data. The output of switch 28 is combined with the signal from audio modulator 16 and supplied to an RF converter 38 for transmission to subscriber terminals. Controller board 32 is coupled over a bidirectional communications path to a controlling computer and memory (CCM) 36 which includes programs for calculating address keys, session keys, data packet generation and data encryption. CCM 36 is also coupled to a keyboard 34 which enables operator control of the controlling computer 36. A data receiver 40 is coupled for supplying information received from individual subscriber terminals to CCM 36. Finally, a bidirectional communications path is provided from the CCM 36 to a cable TV system billing computer 41 for the purpose of billing subscribers who have bought pay per view events. Cable head-ends utilizing transmitters constructed in accordance with FIG. 1 are in use.

Figure 2:
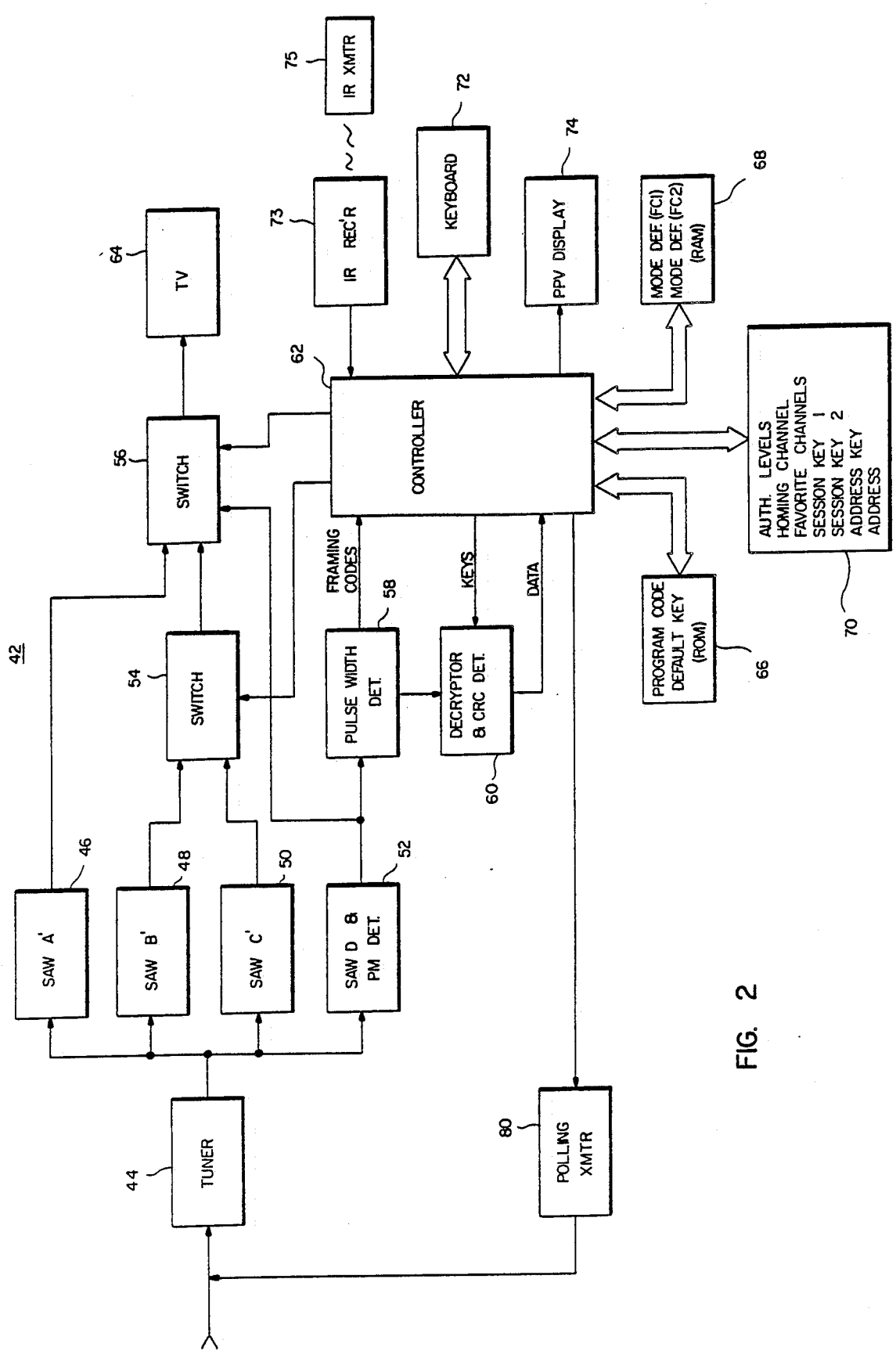
FIG. 2 is a simplified block diagram of a receiver capable of performing the inventive method.

In FIG. 2, a receiver terminal is generally indicated by reference numeral 42. A tuner 44 receives information from head-end 10 and supplies it to a plurality of SAW filters 46, 48 and 50 (identified as A', B' and C', respectively) which are complementary to head-end encoder SAWs A, B and C. Information is also supplied to a block 52 which includes a SAW filter D and a phase modulation detector. The outputs of the SAWs B' and C' are supplied to a switch 54 which in turn supplies a switch 56. The output of SAW A' is coupled directly to switch 56. The output of phase modulation detector 52 is coupled to a pulse width detector 58 and to switch 56. Pulse width detector 58 supplies framing code (FC) signals to a microprocessor based controller 62 and also supplies pulse width demodulated data pulses to a block 60 labelled Decryptor and CRC Detector. CRC, as is known, is an acronym for cyclical redundancy code used for data error detection. Block 60 supplies data to controller 62 and controller 62 in turn supplies keys (both session and address) to block 60. Controller 62 operates both switches 54 and 56 to unscramble the scrambled signal by selecting SAWs A' and B' and SAWs A' and C' under control of the framing codes and mode definition data, as described in copending application Ser. No. 025,235, to unscramble the received television signal. The output of switch 56 is supplied to the television receiver 64. Controller 62 is coupled via a bidirectional communication path to a ROM 66 which includes a program code and a default key and to a RAM 68 which may include mode definitions for framing code signal No. 1 and framing code signal No. 2. Another bidirectional communication path couples controller 62 to memory 70 which includes means for storing information regarding the authorization levels of the subscriber terminal, homing channels, favorite channels, session keys X and Y, an address key and an address. Another bidirectional communication path links a keyboard 72 to controller 62 and a pay per view display 74 is coupled to controller 62. Additionally, an IR (infrared) receiver 73 is connected to the controller 62 for the purpose of receiving tuning and PPV request commands from the subscriber using an IR remote control transmitter 75. Finally, a polling transmitter 80 is coupled to controller 62 for supplying the contents of the authorization memory of the subscriber terminal to the cable head-end when requested by an appropriate polling command addressed to it.

The operation of the SAW filters A, B and C in FIG. 1 for scrambling a television signal and of SAW filters A', B' and C' for unscrambling the scrambled television signal is fully described in the above copending applications and the patents referred to therein. Similarly, operation of the framing codes and of the scrambling mode definitions is fully described in U.S. Pat. No. 4,817,144. Further, the operation of the IPPV tag and program tags and the system for enabling self-authorization of a subscriber terminal for viewing special pay per view programs is described in copending application Ser. No. 126,452.

For security, it is desirable to operate a subscription television system in such a way that would-be pirates are thwarted in their efforts to illegally unscramble the television signal. This may be accomplished by periodically changing session keys. In the broadest aspect of the inventive method, a subscriber terminal need only have provision for storing a single session key. In accordance with the inventive method, the global data packets, that is the data packets that are receivable by all subscribers, as distinct from the addressed data packets which are receivable by the addressed subscriber terminal, are alternately encrypted with two different session keys.

In the system of the invention, the global data packets are alternately encrypted with different session keys. After being successfully polled, the head-end downloads a new session key to the corresponding subscriber while continuing to alternate global packet encryption between the old key and the new key. Subscribers who have the old key can still decrypt the global data packets and subscribers who have the new key can also decrypt the global data packets. After a selected period of time, the cable head-end switches to encryption with the new key and a different key.

Assume that all subscriber terminals have session key #1 and that the television signal includes global data packet alternately encrypted in each field of the signal with session key #1 and session key #2. Assuming that all authorized subscriber terminals have stored session key #1, they will decrypt the global data packets and therefore receive program tag information relative to the scrambled television programs. If they are authorized for the program defined by the accompanying program tag, they will be enabled to operate their unscrambling apparatus to unscramble the program.

The head-end now downloads a new session key #2 to successfully polled subscribers. Both session keys #1 and #2 continue to work and subscribers having stored either key will decrypt the global data packets. Now a change at the head-end to alternate global packet encryption between session keys #2 and #3 (a new key) will result in subscriber terminals with session key #1 being incapable of decrypting the global data packets and therefore incapable of obtaining the program tags. These terminals will not be able to unscramble the television program. Since all successfully polled subscriber terminals have key #2, they continue to be able to decrypt the global data packets. During a subsequent polling cycle, the head-end will download session key #3 to the subscriber terminals while continuing to alternate encryption of the global data packets with session keys #2 and #3. After the polling cycle is complete, a change to encryption with session keys #3 and a new session key #4 is made. Thus, changes in session keys may be made without "down time" for loading the new keys to the subscriber terminals. Since there are literally thousands of session keys that may be used, even the basic system as described is secure from would-be pirates.

In the preferred implementation of the invention, the subscriber terminals are capable of storing three session keys and of searching among those three keys until error free decryption of a global data packet is obtained. This is fully disclosed in U.S. Pat. No. 4,771,458. The system of the invention has particular benefit in an impulse pay per view arrangement where not only is the program tag included in the global data packet but an IPPV tag is also included for permitting subscribers to self-authorize their terminals to unscramble an IPPV program. In the IPPV system, it is important that the subscriber terminal memory location corresponding to the IPPV tag be successfully polled to be sure that the subscriber terminal is billed for authorizing his terminal to unscramble the special program. The system of the invention accomplishes this by changing session keys very frequently and by not downloading a new session key to a subscriber terminal until that subscriber terminal has been successfully polled. This is readily accomplished where the global data packets are alternately encrypted with different session keys.

The following example will illustrate operation of the inventive method. Assume a subscriber's decoder has session key #1 (and two other session keys A and B). Assume further that a subscriber self-authorizes his decoder for an upcoming IPPV program corresponding to a memory location 8. Later that program is broadcast with a program tag corresponding to memory location 8 and alternately encrypted in session keys #1 and #2. Since the subscriber's decoder has session key #1, he is able to decode and watch the program. After the program, if the subscriber stays on a data channel, i.e. one in which the head-end can communicate to him via an addressed data packet, his decoder will be polled and his authorization memory read and the contents sent upstream to the head-end for billing purposes. Thereafter, the subscriber will be provided with session key #2 in an addressed data packet and after termination of the event assigned to the IPPV program corresponding to memory location 8, the authorization bit stored in memory location 8 will be cleared by a command in a global data packet encrypted with session key #2. Since only polled terminals can decrypt the clear command, memory location 8 in their memories is available for use again.

Assume that a subscriber, after watching an IPPV program, tunes to a non-data channel such that his terminal cannot be polled. Since it is not polled, it is not given new session key #2 and the authorization bit in memory location 8 is not cleared in response to the global command that is encrypted in session key #2. This subscriber will also not be able to view future IPPV programs because he does not have the correct session key to decrypt the global program tag packet. If the subscriber wants to watch an IPPV program, he must first tune to a data channel and be polled and billed for the previous program authorized in his authorization memory location 8. When his authorization memory is polled, the terminal is given the then current session key (assume it stays at key #2) via an addressed data packet whereupon the subscriber can again self-authorize his terminal for the new IPPV program, since the global data packet containing the program key is being alternately encrypted in session keys #2 and #3. In practice, subscriber terminals that have not been successfully polled are placed on a separate polling list and polled on a more frequent basis by means of addressed data packets, to obtain billing information and restore them to full operational status.

It should be noted that, by assuring that whenever a program tag is used again, that is encrypted in a different session key than it was previously, subscribers are prevented from self-authorizing terminals and watching more than one IPPV program corresponding to that particular memory location. This is because there are thousands of different session keys available and duplication need not occur for a very long time period. Thus the inventive method effectively solves the problem of the subscriber who, for one reason or another, is not polled in a timely manner by the cable head-end.

What is claimed is:

1. A method of operating a television scrambling system including a plurality of subscriber terminals having selectively controllable descrambling means and a first session key comprising the steps of:
    alternately transmitting a scrambled television signal with a data packet encrypted with said first session key and transmitting said scrambling television signal with said data packet encrypted with a second session key, to all subscriber terminals to permit operation of said descrambling means to descramble the television signal by subscriber terminals having said first session key or said second session key;
    transmitting said second session key to authorized subscriber terminals only; and
    alternately transmitting said scrambled television signal with a data packet encrypted with said second session key and transmitting said scrambled television signal with said data packet encrypted with a third session key to all subscriber terminals, whereby subscriber terminals with said first session key and without said second session key or said third session key cannot descramble said television signal.

2. The method of claim 1 wherein said second session key is downloaded in data packets addressed to individual subscribers.

3. The method of claim 2 wherein each subscriber terminal stores two session keys that are changeable by means of addressed data packets; and
    wherein each subscriber terminal sequentially tries its two session keys in an attempt to decrypt the encrypted data packets.

4. The method of claim 3, further including the steps of:
    attempting to poll subscriber terminals to determine their status; and
    downloading said second session key only to subscriber terminals that have been successively polled.

5. A method of operating a pay per view television signal system including a plurality of subscriber terminals, each having an authorization memory comprising a plurality of memory locations for storing authorization data, unscrambling means for unscrambling a received television program in response to authorization data stored in a memory location identified by a simultaneously received program tag and a first session key for decrypting data packets, comprising the steps of:
    transmitting a program tag, identifying a memory location of said authorization memory corresponding to a selected pay per view television program, in a data packet alternately encrypted with said first session key and a second session key;
    permitting subscriber terminals having said first session key to input authorization data to said memory location;
    transmitting said pay per view television program together with a program tag identifying said memory location;
    polling each subscriber terminal to read the status of said memory location;
    transmitting said second session key in individually addressed data packets to successfully polled subscriber terminals only;
    clearing the authorization data at said memory location by a transmitted data packet encrypted in said second session key; and
    transmitting a program tag identifying a memory location corresponding to a selected pay per view television program in a data packet alternately encrypted with said second session key and a third session key.

6. The method of claim 5 wherein said television signal has two fields and wherein the alternate encryption of said data packets occurs in said two fields of the transmitted television signal.

* * * * *